US007415290B2

(12) United States Patent
Murray et al.

(10) Patent No.: US 7,415,290 B2
(45) Date of Patent: Aug. 19, 2008

(54) MOBILE TERMINAL WITH LOUDSPEAKER SOUND REDIRECTION

(75) Inventors: Mathew J. Murray, Raleigh, NC (US); William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 182 days.

(21) Appl. No.: 10/905,063

(22) Filed: Dec. 14, 2004

(65) Prior Publication Data

US 2006/0128440 A1 Jun. 15, 2006

(51) Int. Cl.
*H04M 1/00* (2006.01)
*H04B 1/38* (2006.01)

(52) U.S. Cl. .................. 455/569.1; 455/575.1; 455/565

(58) Field of Classification Search .............. 455/569.1, 455/575.1, 565, 575.3, 566, 89
See application file for complete search history.

(56) References Cited

U.S. PATENT DOCUMENTS

| 5,276,916 | A  | * | 1/1994  | Pawlish et al. ........... 455/575.1 |
| 6,035,211 | A  |   | 3/2000  | Rabe et al.                         |
| 6,678,504 | B1 |   | 1/2004  | Toki                                |
| 6,792,293 | B1 | * | 9/2004  | Awan et al. ................. 455/566 |
| 6,917,824 | B2 | * | 7/2005  | Kobayashi ............... 455/575.3  |
| 7,187,958 | B2 | * | 3/2007  | Nishijima et al. ........ 455/575.3  |
| 2004/0132513 | A1 | * | 7/2004 | Taneda et al. ............ 455/575.3 |
| 2004/0204122 | A1 | * | 10/2004 | Opela et al. ................. 455/565 |
| 2004/0229594 | A1 |   | 11/2004 | Jung et al.                         |
| 2005/0215296 | A1 | * | 9/2005  | Fujihara et al. .......... 455/575.3 |

FOREIGN PATENT DOCUMENTS

| EP | 1 594 295 A1 | * | 1/2004  |
| EP | 1473910      |   | 11/2004 |
| EP | 1594295      |   | 11/2005 |
| WO | WO 2004073287 |  | 8/2004  |

OTHER PUBLICATIONS

Sony Ericsson Mobile Communications AB, International Application No. PCT/US05/024432, *International Preliminary Examination Report*, Jan. 18, 2006.
Sony Ericsson Mobile Communications AB, International Application No. PCT/US05/024432, *Written Opinion*, Jan. 18, 2006.
Sony Ericsson Mobile Communications AB, International Application No., PCT/US2005/029048, International Preliminary Examination Report, Mar. 27, 2007.

* cited by examiner

*Primary Examiner*—Charles N Appiah
*Assistant Examiner*—Kiet Doan
(74) *Attorney, Agent, or Firm*—Matthew W. Witsil; Moore & Van Allen PLLC (57) ABSTRACT

A mobile terminal having a pivoting design includes an earpiece (receiver unit) and a separate, dedicated loudspeaker and loudspeaker port that may direct sound toward a user when the terminal is in the open position and ports the sound in a different direction when the terminal is in a closed position. This separate, dedicated loudspeaker transducer and loudspeaker porting may provide separate, hands-free voice and alert signals from a position spaced from that of a conventional receiver (or earpiece), which may contribute to appropriately adjusted acoustic levels for a user.

29 Claims, 9 Drawing Sheets

MOBILE TERMINAL WITH LOUDSPEAKER SOUND REDIRECTION

FIELD OF THE INVENTION

This invention relates to the field of acoustic devices, and more particularly to loudspeakers in mobile terminals having a pivoting design.

BACKGROUND

Cellular phones and other like products often use two devices for generation of sound to be heard by a user. A transducer acts as a receiver. A separate unit, such as a buzzer, functions to provide "alert signals" to the user. Alert signals include ring tones when a call is being received, system signals such as to indicate a low battery, and other sounds such as tones for electronic games. These alert tones generally need to be of sufficient volume to be heard in a noisy environment. In some cases the buzzer may instead be a second speaker. Similar functions may be provided by the two speakers in this configuration: One speaker generally acts to provide sound for a user to hear in a phone call, and the other speaker provides sound for alert functions. This type of design, involving a receiver or earpiece speaker, and a separate, high-output, loudspeaker allows for appropriate sound output levels and frequency responses to be set for handheld use and use at a distance, respectively.

In some designs of clamshell-style and jackknife-style mobile handsets it is desirable to have sound projected from the handset when the handset is in the open, extended position and when the handset is in the closed position. In addition, many modern mobile handsets offer a type of handheld "walkie-talkie" type of audio known as Push-to-Talk (PTT). One reason for PTT's popularity is that as a matter of convenience a user need not hold the handset close to the ear. There are technical requirements, however, placed on mobile handsets that result from PTT functionality.

In order to provide acceptable audio levels at a distance of up to arm's length away from the ear, even, for example, in noisy environments such as construction sites, factories, highways, or city streets, PTT devices must be capable of producing very high sound pressure levels without excessive distortion. To do so, a relatively large acoustic transducer is needed. Further, in some mobile handsets having a clamshell design or jack-knife design with a flip attached to a base, the handset opens and closes around a hinge near the midpoint of the handset. Audio is preferably clearly audible in either position of the flip because users often want to access the PTT function without having their phone in the open position. Some mobile handsets with PTT functionality also include speakerphone capability that allows use without holding the handset, which may require clear audio at distances greater than arms' length.

Accordingly, there is a need for a mobile handset configuration that provides appropriately adjusted acoustic levels and frequency characteristics at the handset's earpiece via the use of a traditional acoustic receiver unit, provides polyphonic and/or loudspeaking functionality using a separate, remotely mounted loudspeaker, and directs the audio alert and loudspeaker acoustic output generally toward a user in order to provide clear audio whether in the open or closed position. There is also a need for the handset configuration to provide speakerphone capability.

SUMMARY OF THE INVENTION

In accordance with an embodiment of the present invention, a mobile terminal includes a base, a flip pivotally mounted to the base, and a transducer for producing sound mounted to the inside of the flip. The transducer is in acoustic communication with a port opening in the flip. The opening is disposed proximate to the pivotal mounting between the base and the flip, and the base has a front surface. The terminal has an open, extended position where the flip is pivoted away from the front surface of the base and a closed position where the flip is in complimentary registration with the front surface of the base.

In accordance with another embodiment of the present invention, a mobile terminal includes a flip, a base pivotally mounted to the flip, and a transducer for producing sound mounted to the inside of the base. The transducer is in acoustic communication with an opening in the base. The opening is disposed proximate to the pivotal mounting between the base and the flip, and the base has front and back surfaces. The terminal has an open, extended position where the flip is pivoted away from the front surface of the base and a closed position where the flip is in complimentary registration with the front surface of the base.

In both of the previous two embodiments the opening is at least partially exposed to an environment between the flip and the front surface of the base when the terminal is in the open position, and to an environment away from the flip and the front surface of the base when the terminal is in the closed position.

In accordance with another embodiment of the present invention, a method of making a mobile terminal includes providing a base and pivotally mounting a flip to the base. The base has a front surface. There is an opening in the flip that is disposed proximate to the pivotal mounting between the base and the flip. The terminal has an open, extended position where the flip is pivoted away from the front surface of the base and a closed position where the flip is in complimentary registration with the front surface of the base. The method further includes mounting a transducer for producing sound to the inside of the flip and in acoustic communication with the opening.

In accordance with another embodiment of the present invention, a method of making a mobile terminal includes providing a flip and pivotally mounting a base to the flip. The base has a front surface. There is an opening in the base that is disposed proximate to the connection between the base and the flip. The terminal has an open, extended position where the flip is pivoted away from the front surface of the base and a closed position where the flip is in complimentary registration with the front surface of the base. The method further includes mounting a transducer for producing sound to the inside of the base and in acoustic communication with the opening.

In each of the two previous embodiments of making a mobile terminal, the opening is at least partially exposed to an environment between the flip and the front surface of the base when the terminal is in the open position, and to an environment away from the flip and the front surface of the base when the terminal is in the closed position.

In accordance with another embodiment of the present invention, a method of directing sound from a mobile terminal includes stimulating a transducer in the terminal to produce sound. The sound is ported from the transducer proximate to a pivotal mounting between a base and a flip in the mobile terminal. The base has a front surface. The terminal is disposed in an open, extended position where the flip is pivoted away from the front surface of the base. The sound is thereby directed from the transducer to an environment between the flip and the front surface of the base. At that time or another time the terminal is disposed in a closed position where the flip is in complimentary registration with the front surface of the base. Sound is thereby directed from the transducer away from the flip and the front surface of the base.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

DETAILED DESCRIPTION OF THE INVENTION

The present invention is directed towards mobile terminals having a clamshell, jack-knife, or otherwise folding design. As used herein, the term "mobile terminal" may include, among other things, a cellular radiotelephone with or without a multi-line display, a Personal Communications System (PCS) terminal that may combine a cellular radiotelephone with data processing, facsimile, and data communications capabilities; a PDA that can include a radiotelephone, pager, Internet/intranet access, Web browser, organizer, calendar and/or a global positioning system (GPS) receiver; a conventional laptop and/or palmtop receiver or other appliance, a personal music playback system such as for CDs, minidisks, MP-3 files, memory sticks, or the like; and a device that includes push-to-talk functionality. The term "handset" is used for convenience to refer to the embodiments illustrated herein, but should not be considering as limiting to the scope of the invention or to the term "mobile terminal."

A handset may have an extended, open position, separating a flip from a base. Although the term "flip" often refers to a portion of a cellular telephone that folds and unfolds relative to a base, it should be understood that "flip" as used herein refers to any like portion of any mobile terminal. Likewise, the term "base" should be understood to mean any portion of a mobile terminal that opposes a flip, and may sometimes include most of the operational electronics of the mobile terminal, include a keypad, and be thicker than the flip. Flips sometimes, but not always, include a display, and may be connected to the base with one or more hinges. It should be understood that terms of orientation, such as "top", "bottom", "above", "below", "right", and the like are used for convenience only in referring to the orientation of the embodiments on the drawings, and should be understood as not limiting to the present invention unless otherwise necessary.

With positioning and porting in accordance with the present invention, a single transducer may be used to provide both hands-free voice and alert signals, including PTT functionality, with a mobile terminal in either an open, extended configuration or closed configuration. As applicable, the transducer may be positioned spaced from the ear sealing region on the mobile terminal that is around a conventionally located receiver, contributing to appropriately adjusted acoustic levels for the user, especially when allowing internal structures to be placed in the terminal. The internal structures may act to provide acoustic isolation between the loudspeaker transducer and the receiver transducer.

Figure 1:
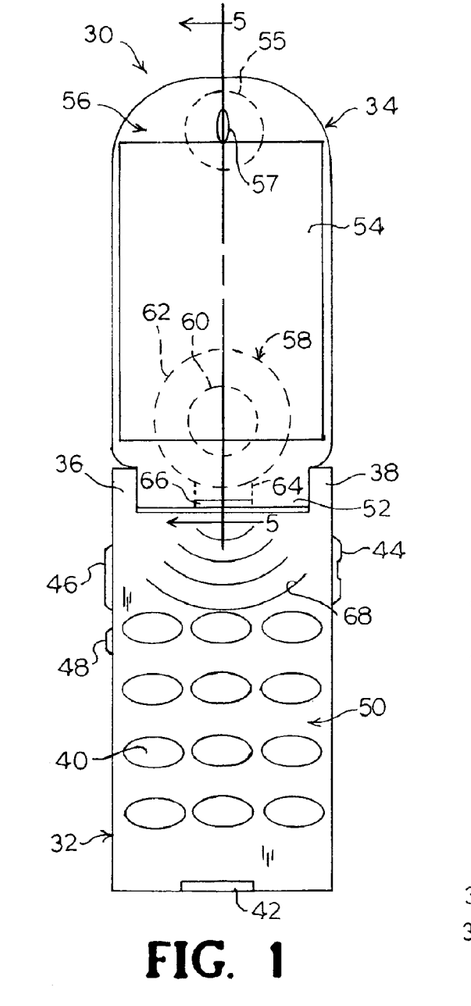
FIG. 1 is a front elevation view of a mobile handset in an open position in accordance with an embodiment of the present invention.

Referring now to the drawings, FIG. 1 is a front elevation view of a clamshell-style mobile terminal or handset 30 in accordance with an embodiment of the present invention. The handset 30 is in an extended, open position, with a base 32 and a flip 34 spread apart around a connection, such as hinges 36, 38 or the like. The base 32 of the handset 30 may house a keypad 40, microphone 42, volume/scroll button 44, push-to-talk button 46, and speakerphone on/off button 48. Various other features may be provided, and the features shown need not be present and are not limiting to the scope of the present invention. The base 32 is a housing that has a front surface 50 and a back surface (not shown). The hinges 36, 38 are part of the base 32 and connect the base and the flip 34, with a central, bottom portion 52 of the flip being located between the hinges. The flip 34 is a housing and may include a display 54, conventionally located receiver 55, and other features, and also has a front surface 56 and a back surface (not shown). A port opening 57 ports receiver-produced sound through the flip front surface 56. Although shown herein with the flip 34 on top of the base 32, other configurations are possible, such as having a flip fold down from a base.

In the handset of FIG. 1 a transducer 58, shown in hidden line, is mounted to the interior of the flip 34. The mounting method may be performed as known by one of ordinary skill in the art. The transducer 58 may be of any type appropriate for sound generation and may include, for example, a magnet 60 and a diaphragm 62 as shown. An acoustic pathway 64 is provided from the transducer 58 to the central portion 52 of the bottom of the flip 34, placing the transducer in acoustic communication with a port opening 66 in the flip. As shown, when the handset 30 is in this open position, the port opening 66 of the acoustic pathway 64 is directed towards the front of the handset, which may face a user when used at a distance, held in front of a user's face or ear. The opening 66 is exposed to the environment between the flip front surface 56 and the base front surface 50, and sound 68 is thereby directed to the same environment, and towards the user. The location of the transducer 58, spaced from the conventional location of a receiver 55, contributes to appropriately adjusted acoustic levels for the user. Again, allowing internal structures to be placed in the handset may help provide acoustic isolation between the loudspeaker transducer 58 and the receiver transducer 55.

Figure 2:
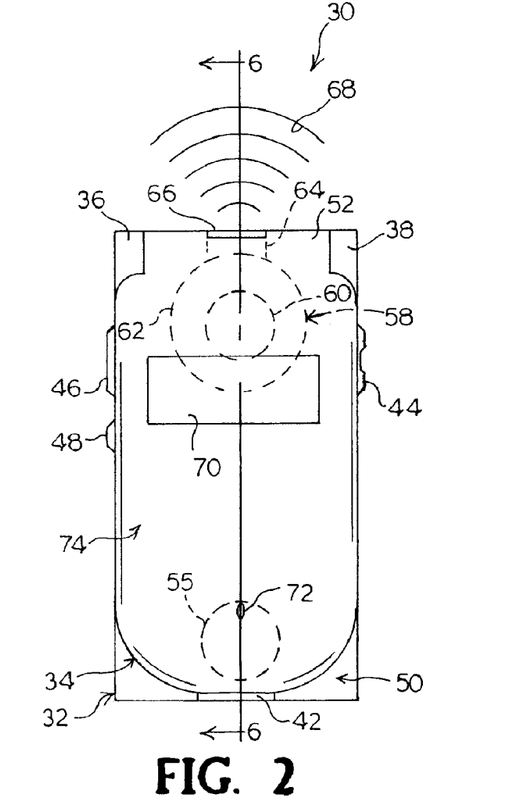
FIG. 2 is a front elevation view of the mobile handset of FIG. 1 in a closed position.

As shown in FIG. 2, the flip 34 may also include a display 70 and an alternative microphone 72 to the microphone 42 in the base 32, exposed on the flip back surface 74. The alternative microphone 72 may be desirable especially if the microphone 42 in the base is obstructed by the closed flip. The handset 30 is in the closed position, with the front surface 56 (FIG. 1) of the flip 34 in complementary registration with and directly opposing the front surface 50 of the base 32. "Complementary registration" means the flip is aligned in front of the base, as occurs when the handset is in the closed position. The opening 66 of the acoustic pathway 64 from the transducer 58 is directed upwards, to the environment away from the front surfaces 50, 56 of the base 32 and flip 34. Thus, the same transducer 58 projects sound 68 away from the handset 30 directly to the environment in both the open and closed positions. This is effected by rotation of the port opening 66 in the flip 34 relative to the base 32.

Figure 3:
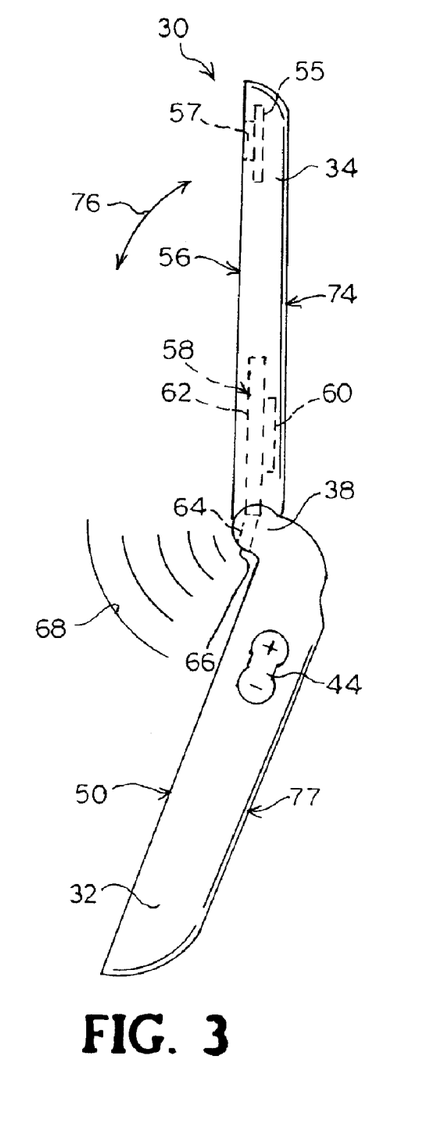
FIG. 3 is a simplified right side elevation view of the mobile handset of FIG. 1 in an open position.
Figure 4:
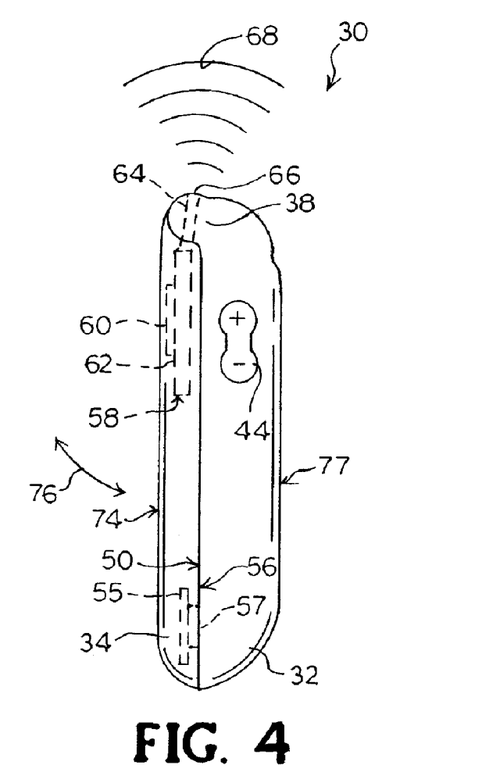
FIG. 4 is a simplified right side elevation view of the mobile handset of FIG. 1 in a closed position.

FIGS. 3 and 4 show simplified right side elevation views of the handset 30 in open and closed positions, respectively. Relative pivoting of the base 32 and flip 34 as shown by the arrow 76 alternates the handset 30 between the open and closed positions. The hinges 36, 38 are outboard of the bottom, center portion 52 of the flip 34 (see FIG. 1), and as such the right hinge 38 is seen in FIGS. 3 and 4. In the closed position of FIG. 4, the flip back surface 74 and base back surface 77 form the exterior surface of the handset 30.

Figure 5:
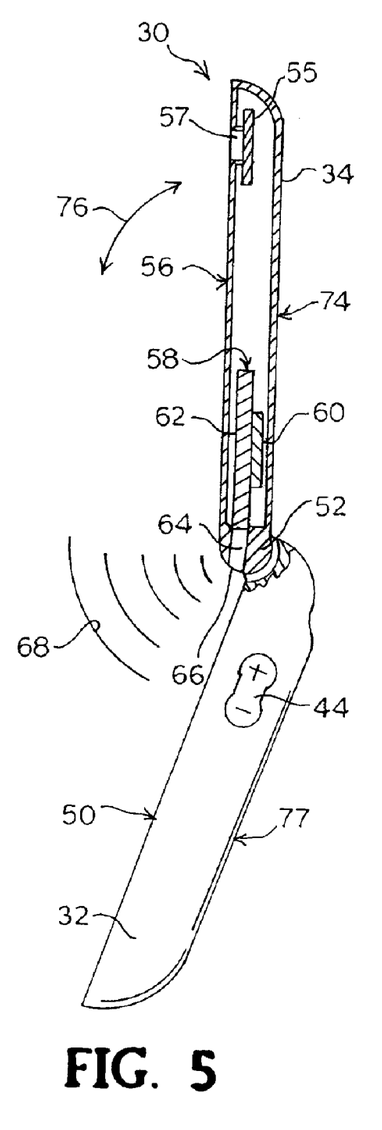
FIG. 5 is a simplified partial section view of the mobile handset of FIG. 1 in an open position taken along line 5-5 of FIG. 1.
Figure 6:
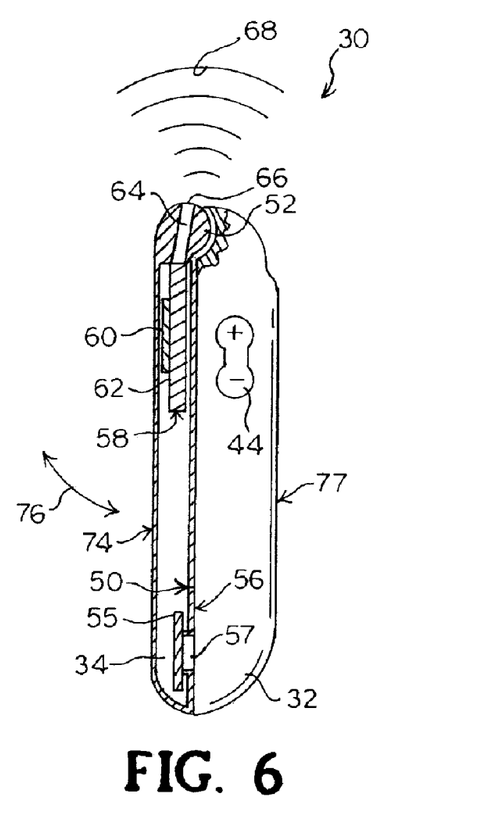
FIG. 6 is a simplified partial section view of the mobile handset of FIG. 1 in a closed position taken along line 6-6 of FIG. 2.

FIGS. 5 and 6 show simplified partial section views of the handset 30 in open and closed positions, respectively. The bottom, center portion 52 of the flip 34, located at the middle of the handset 30 in FIG. 5 and located at the upper end of the handset 30 in FIG. 6 because the handset is in the closed position, may be seen in these views. As shown in FIGS. 3 and 5, the opening 66 of the acoustic pathway 64 directs sound 68 towards the environment in front of the handset 30, or toward a user when the front surfaces 50, 56 of the handset face the user. Downward directed sound 68 may be further reflected toward the user by the front surface 50 of the base. FIGS. 4 and 6 show the acoustic pathway 64 and opening 66 rotated to point generally upward with the handset 30 in the closed position, redirecting the sound 68 from being projected generally downward so that the sound is audible to the user from the single transducer 58. When the handset 30 is closed, this orientation could prove very useful when the handset is stored, for example, in a pocket, as sound is directed up and out of the pocket toward the user.

A variety of features may be implemented in accordance with embodiments of the present invention. For example, a handset may have push-to-talk functionality and the transducer may be a push-to-talk loudspeaker. The transducer may function as both a dynamic microphone and a loudspeaker. The transducer may provide sound for both hands-free voice and alert signals. There may be a volume control system that automatically varies the sound pressure level provided by the transducer depending on whether the handset is in the open position or the closed position.

Figure 7:
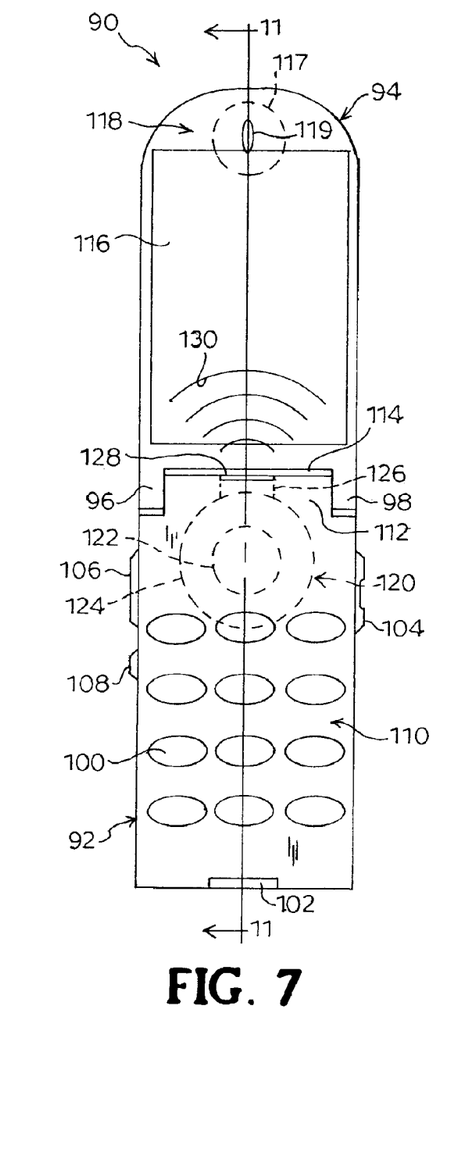
FIG. 7 is a front elevation view of a mobile handset in an open position in accordance with another embodiment of the present invention.

FIG. 7 is a front elevation view of a clamshell-style mobile terminal or handset 90 in accordance with another embodiment of the present invention. The handset 90 is in an extended, open position, again with a base 92 and a flip 94 spread apart around a connection, such as hinges 96, 98 or the like. As with the handset 30 of FIG. 1, the base 92 of the handset 90 may house a keypad 100, microphone 102, volume/scroll button 104, push-to-talk button 106, and speakerphone on/off button 108. The base 92 is a housing that has a front surface 110 and a back surface (not shown). The hinges 96, 98 are part of the flip and connect the base 92 and the flip 94, with a central, top portion 112 of the base being located between the hinges. An optional sound reflector, or lip 114, contiguous with the flip, may extend between the hinges 96, 98 to reflect sound toward the front of the handset 90. The lip 114 may substantially block any gap between the base 92 and flip 94 when the handset is in the open position. The flip 94 is a housing and may include a display 116, conventionally located receiver 117, and other features, and also has a front surface 118 and a back surface (not shown). An opening 119 ports receiver-produced sound through the flip front surface 118.

A transducer 120 is again mounted to the interior of the base 92, with the mounting method as known by one of ordinary skill in the art. The transducer may include a magnet 122 and diaphragm 124 as shown, or other transducer components appropriate for producing sound. An acoustic pathway 126 is provided from the transducer 120 to the central, top portion 112 of the base 92, placing the transducer 120 in acoustic communication with an opening 128 in the base. When the handset 90 is in this open position, the opening 128 of the acoustic pathway 126 is directed upward. The lip 114 reflects sound 130 from the back of the handset 90 to the front, which may face a user when used at a distance, held in front of a user's face or ear. The opening 128 is exposed to the environment between the flip front surface 118 and the base front surface 110, and sound 130 is thereby directed to the same environment, and generally towards the user.

Figure 8:
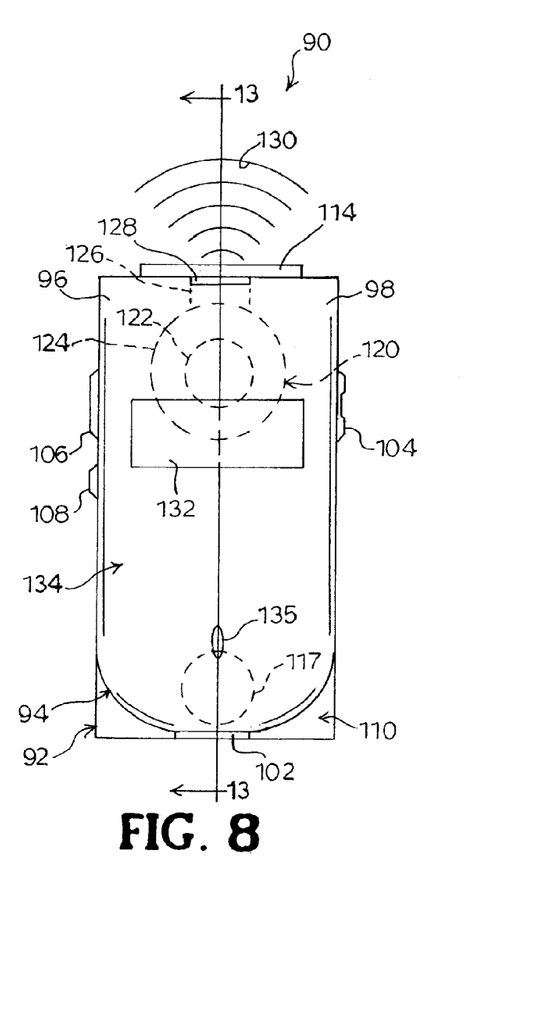
FIG. 8 is a front elevation view of the mobile handset of FIG. 7 in a closed position.

As shown in FIG. 8, the flip 94 may also include on its back surface 134 a display 132 and an alternative microphone 135 to the microphone 102 in the base 92. The handset 90 is in the closed position, with the front surface 118 (FIG. 7) of the flip 94 in complementary registration with the front surface 110 of the base 92. The opening 128 of the acoustic pathway 126 from the transducer 120 is directed upwards, to the environment away from the front surfaces 110, 118 of the base 92 and flip 94. Thus, similarly to the embodiment of FIG. 1 and FIG. 2, the same transducer 120 projects sound 130 away from the handset 90 directly to the environment in both the open and closed positions. This is effected by rotation of the opening 128 in the base 92 relative to the flip 94.

Figure 9:
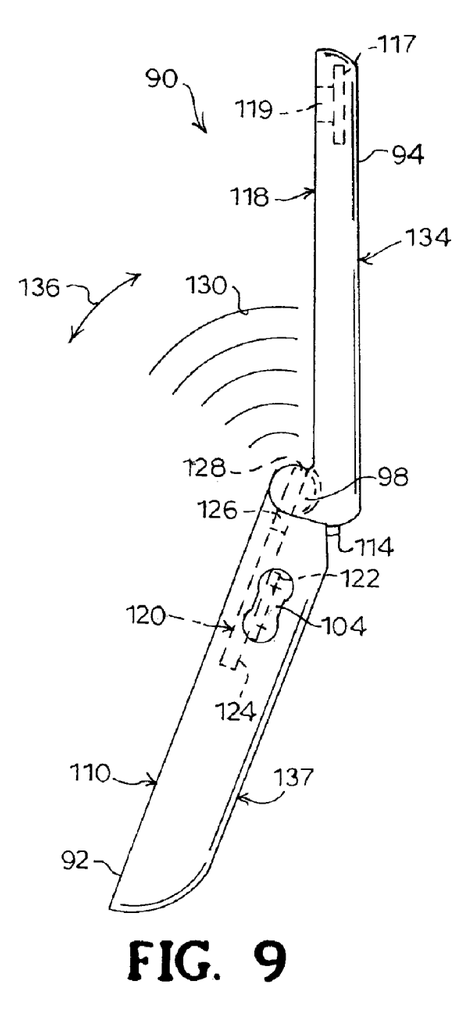
FIG. 9 is a simplified right side elevation view of the mobile handset of FIG. 7 in an open position.
Figure 10:
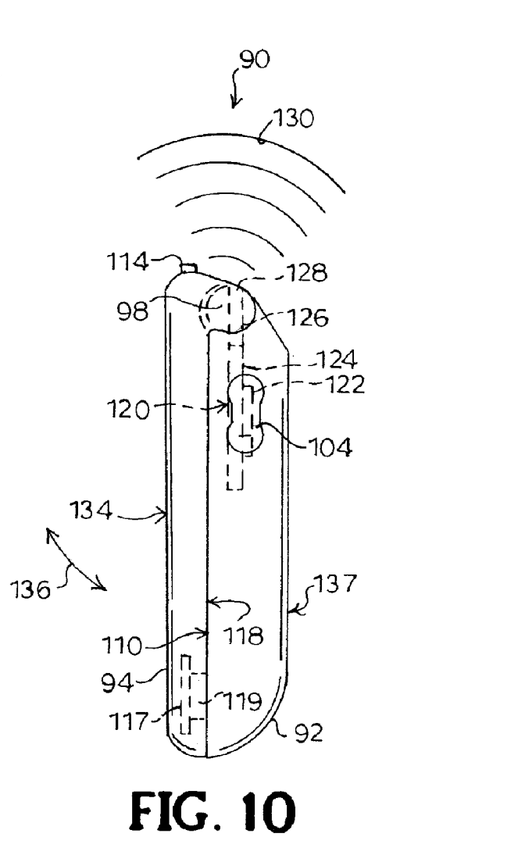
FIG. 10 is a simplified right side elevation view of the mobile handset of FIG. 7 in a closed position.

FIGS. 9 and 10 show simplified right side elevation views of the handset 90 in open and closed positions, respectively. Relative pivoting of the base 92 and flip 94 as shown by the arrow 136 alternates the handset between the open and closed positions. The hinges 96, 98 are outboard of the top, center portion 112 of the base 92 (see FIG. 7), and as such the right hinge 98 may be seen in FIGS. 9 and 10. In the closed position of FIG. 10 the flip back surface 134 and base back surface 137 form the exterior surface of the handset 90. The lip 114 may need to be curved to fully contact the base back surface 137.

Figure 11:
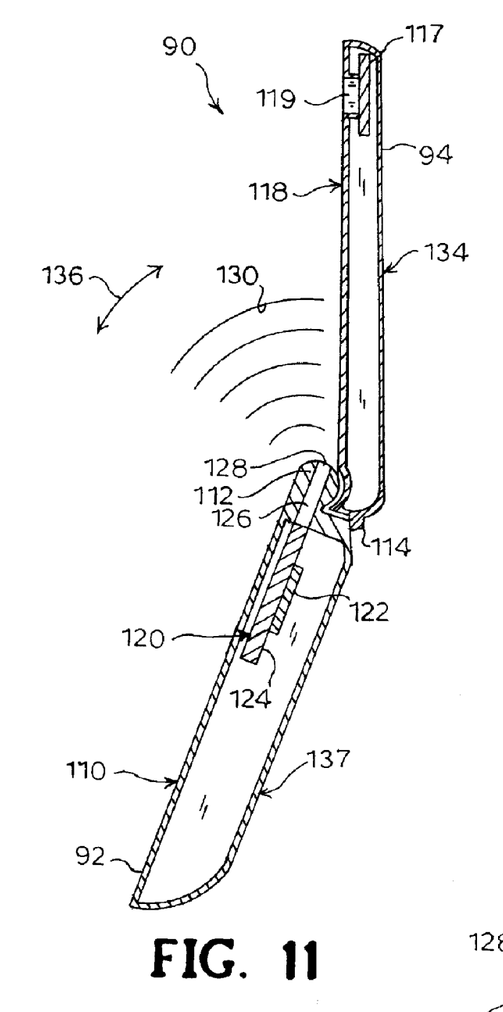
FIG. 11 is a simplified section view of the mobile handset of FIG. 7 in an open position taken along line 11-11 of FIG. 7.
Figure 12:
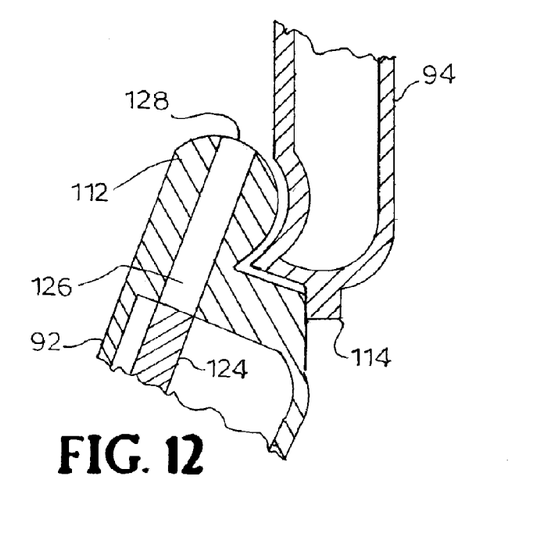
FIG. 12 is an enlarged detail view of a portion of the section view of FIG. 11.
Figure 13:
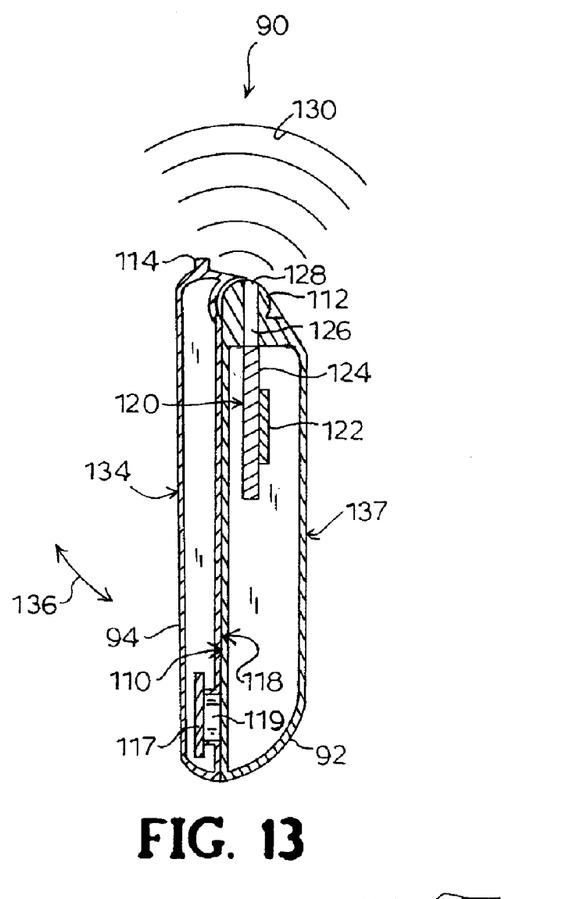
FIG. 13 is a simplified section view of the mobile handset of FIG. 7 in a closed position taken along line 13-13 of FIG. 8.
Figure 14:
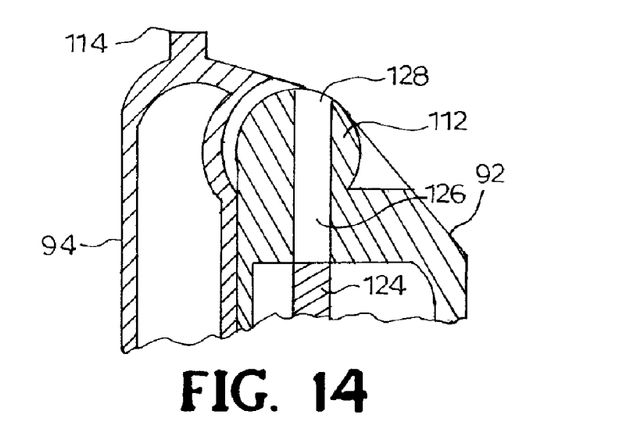
FIG. 14 is an enlarged detail view of a portion of the section view of FIG. 13.

FIGS. 11-12 and 13-14 show simplified section views of the handset 90 in open and closed positions, respectively. The top, center portion 112 of the base 92 may be seen in these views. As shown in FIGS. 9, 11, and 12, the opening 128 of the acoustic pathway 126 directs sound generally upward, and the flip 94 and the lip 114 (FIGS. 11-12) reflect sound 130 towards the environment in front of the handset 90, or toward a user when the front surfaces 110, 118 of the handset face the user. FIGS. 10, 13, and 14 show the acoustic pathway 126 and opening 128 rotated to point generally upward with the handset 90 in the closed position, so that the sound 130 is audible to the user from the single transducer 120.

Figure 15:
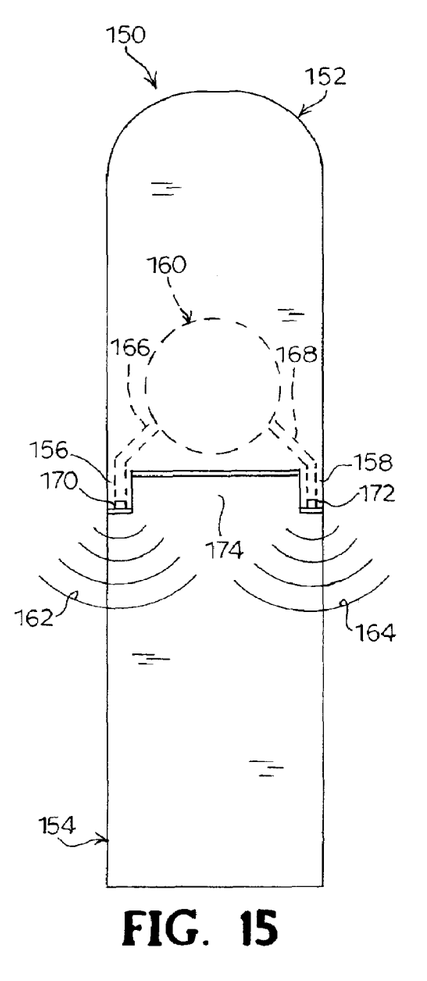
FIGS. 15 and 16 are simplified front elevation views of mobile handsets in accordance with additional embodiments of the present invention.
Figure 16:
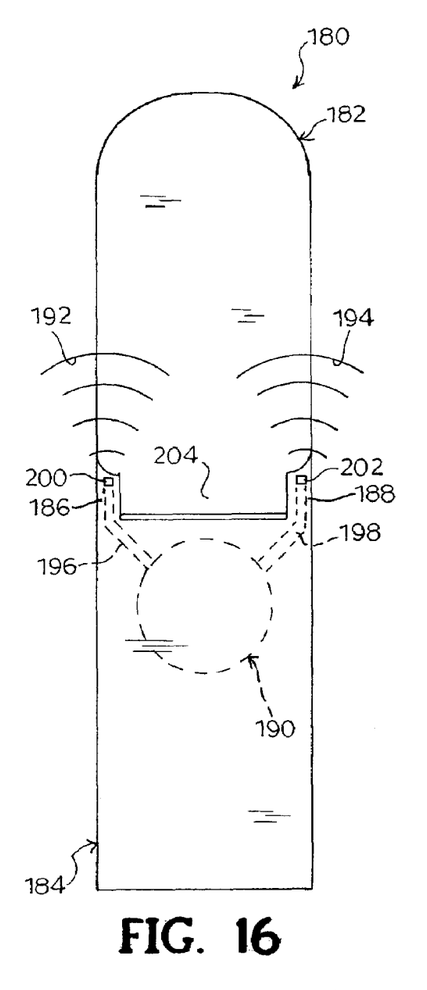

FIGS. 15 and 16 show simplified front elevation views of clamshell-style handsets according to additional embodiments of the present invention. In the handset 150 of FIG. 15, a flip 152 is pivotally connected to a base 154 with hinges 156, 158. A transducer 160 is mounted to the interior of the flip 152, and sound 162, 164 is ported through the hinges 156, 158 which are part of the flip, via acoustic pathways 166, 168 and openings 170, 172. A central portion 174 of the base 154 is disposed between the hinges 156, 158. In the handset of FIG. 16, a flip 182 is pivotally connected to a base 184 with hinges 186, 188. A transducer 190 is mounted to the base 184, and the sound 192, 194 is ported through the hinges 186, 188, which are part of the base 184, via acoustic pathways 196, 198 and openings 200, 202. A central portion 204 of the flip 182 is disposed between the hinges 186, 188. As discussed previously with respect to the embodiments of FIGS. 1 and 7, the port openings of the handsets 150, 180 rotate relative to the opposing flip or base as applicable to be exposed and direct audible sound to the environment in either the open or closed position of the handset.

Figure 17:
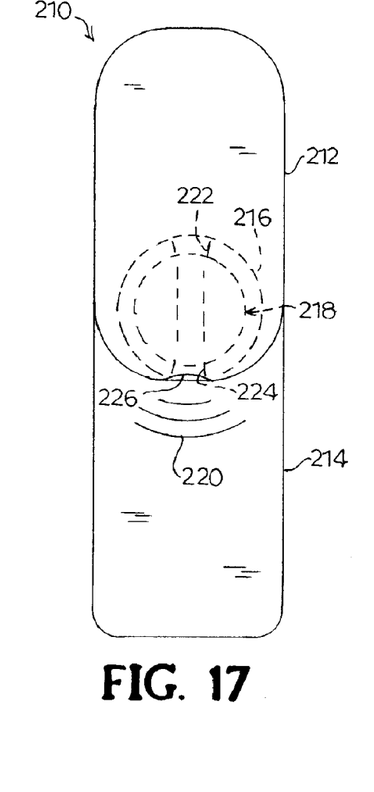
FIGS. 17-19 are simplified front elevation views of a mobile handset in accordance with another embodiment of the present invention.
Figure 18:
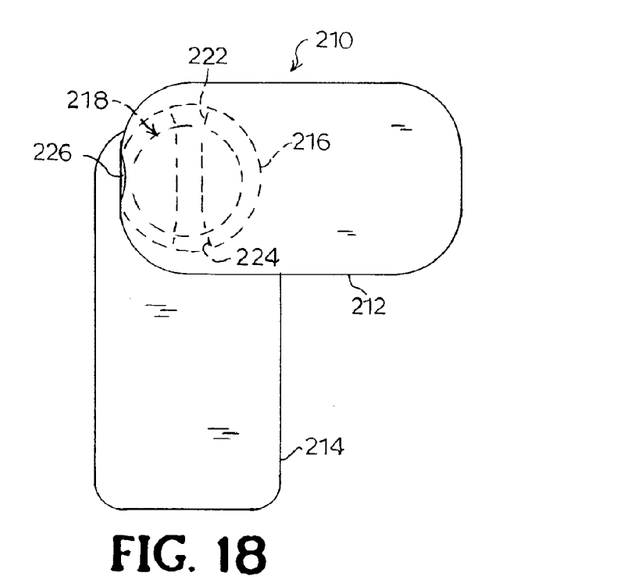
Figure 19:
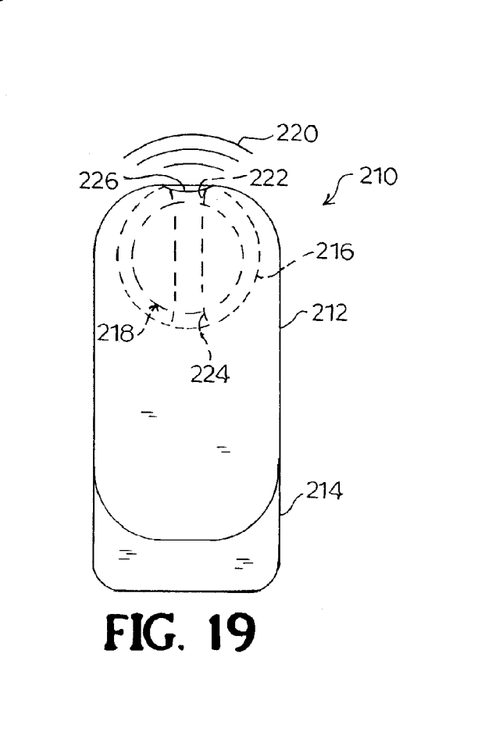

FIGS. 17-19 show simplified front elevation views of a jack-knife-style handset 210 according to an additional embodiment of the present invention. In the handset 210 a flip 212 is pivotally connected to a base 214 with a hinge 216. A transducer 218 is mounted to the interior of the flip 212, and sound 220 is ported through one of two acoustic pathways 222, 224 in the hinge 216 depending on whether the handset 210 is in the open position (FIG. 17) or the closed position (FIG. 19). The acoustic pathways 222, 224 do not rotate with the flip 212, as best seen in FIG. 18. When the handset 210 is in the open position (FIG. 17), the opening 226 is in registration with the acoustic pathway 224. When the handset 210 is in the closed position (FIG. 19), the opening 226 is in registration with the acoustic pathway 222. As the flip 212 is in between the open and closed positions (FIG. 18), the opening 226 is not in registration with either acoustic pathway 222, 224. As discussed previously with respect to the previous embodiments having openings in the flip, the opening of the handset 210 rotates relative to the base to be exposed and direct audible sound to the environment in either the open or closed position of the handset. Alternatively, the transducer 218 could be mounted in the base 214 or in the hinge 216, with acoustic pathways and port openings as appropriate to redirect sound as the handset is pivoted between open and closed configurations.

One of ordinary skill in the acoustic arts will quickly recognize that the invention has other applications in other environments. It will also be understood by someone of ordinary skill in the art that the mounting locations and relative size of the transducer to the housing of the mobile terminal herein are for illustration only and are not necessarily the most efficient or desirable to create a desired acoustic output. In fact, many embodiments and implementations are possible. Various types of transducers and layouts of acoustic pathways and port openings may be used. Acoustic pathway sizes, lengths, and orientations may also be tuned for optimized acoustic performance. The following claims are in no way intended to limit the scope of the invention to the specific embodiments described. It should be understood by those skilled in the art that the foregoing modifications as well as various other changes, omissions and additions may be made without parting from the spirit and scope of the present invention.

What is claimed is:

1. A mobile terminal comprising:
a base including a housing having a front surface and a back surface;
a flip pivotally mounted to the base, the flip including a housing with an opening therethrough, the opening disposed proximate to the pivotal mounting between the base and the flip, wherein the terminal has an open, extended position where the flip is pivoted away from the front surface of the base and a closed position where the flip is in complimentary registration with the front surface of the base; and
a transducer for producing sound mounted to the inside of the flip and in acoustic communication with the opening, wherein the transducer produces sound and the opening emits sound when the terminal is in both the open, extended position and in the closed position,
wherein the opening is at least partially exposed to an environment between the flip and the front surface of the base when the terminal is in the open position and wherein the opening is concurrently blocked from the environment away from the flip and the front surface of the base when the terminal is in the open position; and
wherein the opening is at least partially exposed to an environment away from the flip and the front surface of the base when the terminal is in the closed position.

2. The mobile terminal of claim 1, wherein the mobile terminal has push-to-talk functionality and the transducer is the push-to-talk loudspeaker.

3. The mobile terminal of claim 1, wherein the mobile terminal is clamshell-style.

4. The mobile terminal of claim 1, wherein the mobile terminal is jack-knife-style.

5. The mobile terminal of claim 1, wherein the pivotal mounting between the base and the flip comprises at least one hinge.

6. The mobile terminal of claim 5, wherein the longitudinal axis of the hinge is oriented in the plane of the front surface of the base.

7. The mobile terminal of claim 5, wherein the longitudinal axis of the hinge is oriented perpendicular to the plane of the front surface of the base.

8. The mobile terminal of claim 5, wherein the pivotal mounting is made at one end of the base and one end of the flip, the base with two edges perpendicular to the respective ends with hinges along the base edges, the flip with a central portion proximate to the pivotal mounting and extending between the hinges, and the opening is disposed on the central portion.

9. The mobile terminal of claim 5, wherein the pivotal mounting is made at one end of the base and one end of the flip, the flip with two edges perpendicular to the respective ends with hinges along the flip edges, the base with a central portion proximate to the pivotal mounting and extending between the hinges, and the opening is disposed on at least one hinge.

10. The mobile terminal of claim 1, wherein the transducer functions as a microphone and as a loudspeaker.

11. The mobile terminal of claim 1, wherein the transducer provides sound for hands-free voice and alert signals.

12. The mobile terminal of claim 1, further comprising a volume control system that automatically varies the sound pressure level provided by the transducer depending on whether the terminal is in the open position or the closed position.

13. A mobile terminal comprising:
   a flip including a housing;
   a base pivotally mounted to the flip and including a front surface and a back surface, the base including a housing with an opening therethrough, the opening disposed proximate to the pivotal mounting between the base and the flip, wherein the terminal has an open, extended position where the flip is pivoted away from the front surface of the base and a closed position where the flip is in complimentary registration with the front surface of the base; and
   a transducer for producing sound mounted to the inside of the base and in acoustic communication with the opening,
   wherein the transducer produces sound and the opening emits sound when the terminal is in both the open, extended position and in the closed position,
   wherein the opening is at least partially exposed to an environment between the flip and the front surface of the base when the terminal is in the open position and wherein the opening is concurrently blocked from the environment away from the flip and the front surface of the base when the terminal is in the open position; and
   wherein the opening is at least partially exposed to an environment away from the flip and the front surface of the base when the terminal is in the closed position.

14. The mobile terminal of claim 13, wherein the flip has a front surface and a back surface, and when the terminal is in the closed position the flip is in complementary registration with the front surface of the base and the front surface of the flip opposes the front surface of the base, and further comprising a sound reflector extending partially around the opening of the pivotal mounting between the back surface of the base and the back surface of the flip when the terminal is in the open position.

15. The mobile terminal of claim 13, wherein the mobile terminal has push-to-talk functionality and the transducer is the push-to-talk loudspeaker.

16. The mobile terminal of claim 13, wherein the mobile terminal is clamshell-style.

17. The mobile terminal of claim 13, wherein the mobile terminal is jack-knife-style.

18. The mobile terminal of claim 13, wherein the pivotal mounting between the base and the flip comprises at least one hinge.

19. The mobile terminal of claim 18, wherein the longitudinal axis of the hinge is oriented in the plane of the front surface of the base.

20. The mobile terminal of claim 18, wherein the longitudinal axis of the hinge is oriented perpendicular to the plane of the front surface of the base.

21. The mobile terminal of claim 18, wherein the pivotal mounting is made at one end of the base and one end of the flip, the flip with two edges perpendicular to the respective ends with hinges along the flip edges, the base with a central portion proximate to the pivotal mounting and extending between the hinges, and the opening is disposed on the central portion.

22. The mobile terminal of claim 18, wherein the pivotal mounting is made at one end of the base and one end of the flip, the base with two edges perpendicular to the respective ends with hinges along the base edges, the flip with a central portion proximate to the connection and extending between the hinges, and the opening is disposed on at least one hinge.

23. The mobile terminal of claim 13, wherein the transducer functions as a microphone and as a loudspeaker.

24. The mobile terminal of claim 13, wherein the transducer provides sound for hands-free voice and alert signals.

25. The mobile terminal of claim 13, further comprising a volume control system that automatically varies the sound pressure level provided by the transducer depending on whether the terminal is in the open position or the closed position.

26. A method of making a mobile terminal, comprising:
   providing a base including a housing having a front surface and a back surface;
   pivotally mounting a flip to the base, the flip including a housing with an opening therethrough, the opening disposed proximate to the pivotal mounting between the base and the flip, wherein the terminal has an open, extended position where the flip is pivoted away from the front surface of the base and a closed position where the flip is in complimentary registration with the front surface of the base; and
   mounting a transducer for producing sound to the inside of the flip and in acoustic communication with the opening,
   wherein the transducer produces sound and the opening emits sound when the terminal is in both the open, extended position and in the closed position,
   wherein the opening is at least partially exposed to an environment between the flip and the front surface of the base when the terminal is in the open position and wherein the opening is concurrently blocked from the environment away from the flip and the front surface of the base when the terminal is in the open position; and
   wherein the opening is at least partially exposed to an environment away from the flip and the front surface of the base when the terminal is in the closed position.

27. A method of making a mobile terminal, comprising:
   providing a flip including a housing;
   pivotally mounting a base to the flip, the base including a front surface and a back surface, the base including a housing with an opening therethrough, the opening disposed proximate to the pivotal mounting between the base and the flip, wherein the terminal has an open, extended position where the flip is pivoted away from the front surface of the base and a closed position where the flip is in complimentary registration with the front surface of the base; and
   mounting a transducer for producing sound to the inside of the base and in acoustic communication with the opening,
   wherein the transducer produces sound and the opening emits sound when the terminal is in both the open, extended position and in the closed position,
   wherein the opening is at least partially exposed to an environment between the flip and the front surface of the base when the terminal is in the open position and wherein the opening is concurrently blocked from the environment away from the flip and the front surface of the base when the terminal is in the open position; and
   wherein the opening is at least partially exposed to an environment away from the flip and the front surface of the base when the terminal is in the closed position.

28. The method of making a mobile terminal of claim 27, wherein the flip has a front surface and a back surface, and when the terminal is in the closed position the flip is complementary registration with the front surface of the base and the front surface of the flip opposes the front surface of the base, and further comprising providing a sound reflector extending partially around the opening of the pivotal mounting between the back surface of the base and the back surface of the flip when the terminal is in the open position.

29. A method of directing sound from a mobile terminal including a flip and a base with a front surface and having an open, extended position where the flip is pivoted away from the front surface of the base and a closed position where the flip is in complimentary registration with the front surface of the base, comprising:

stimulating a transducer in the terminal to produce sound in both the open, extended position and closed position of the mobile terminal;

porting the sound from the transducer to an opening proximate to a pivotal mounting between the base and the flip;

disposing the terminal in the open, extended position;

when the terminal is in the open, extended position, exposing the opening to an environment between the flip and the front surface of the base and concurrently blocking the opening from an environment away from the flip and the front surface of the base;

disposing the terminal in the closed position where the flip is in complimentary registration with the front surface of the base; and when the terminal is in the closed position, exposing the opening to an environment away from the flip and the front surface of the base.

* * * * *